(12) United States Patent
Lewis (10) Patent No.: US 8,967,059 B2
(45) Date of Patent: *Mar. 3, 2015

(54) METHOD OF RECYCLING EXHAUST EMISSIONS

(71) Applicant: N/C Quest Inc., Pincher Creek (CA)

(72) Inventor: Gary Lewis, Pincher Creek (CA)

(73) Assignee: N/C Quest Inc., Pincher Creek, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,023

(22) Filed: Sep. 23, 2013

(65) Prior Publication Data

US 2014/0020366 A1    Jan. 23, 2014

Related U.S. Application Data

(63) Continuation of application No. 13/270,764, filed on Oct. 11, 2011, now Pat. No. 8,573,143, which is a continuation of application No. 11/916,673, filed as application No. PCT/CA2006/000914 on Jun. 6, 2006, now Pat. No. 8,061,283.

(30) Foreign Application Priority Data

Jun. 6, 2005    (CA) .................................... 2509172

(51) Int. Cl.
*A01B 79/02*    (2006.01)
*A01B 45/02*    (2006.01)
(Continued)

(52) U.S. Cl.
CPC ................ *F01N 3/00* (2013.01); *A01C 23/023* (2013.01); *B01D 53/85* (2013.01); *B01D 53/92* (2013.01);
(Continued)

(58) Field of Classification Search
CPC ...... F01N 3/00; A01C 23/023; A01C 21/007; B01D 53/85; B01D 53/92; C05D 9/00; C05G 3/0052; Y10S 111/90; Y10S 47/10
USPC .......... 111/200, 900, 118, 119, 127; 123/1 R, 123/41.01, 41.18, 41.2, 41.3, 41.31; 47/DIG. 10, 905, 58.1 R, 58.1 SC, 57.5, 47/1.01 R, 1.01 F; 405/128.1–128.9, 130, 405/131, 258.1, 303; 701/50; 56/DIG. 3
See application file for complete search history.

(56) References Cited

U.S. PATENT DOCUMENTS 3,888,652 A    6/1975    Yie
4,133,671 A    1/1979    Mikel
(Continued)

FOREIGN PATENT DOCUMENTS

CA    2409883    4/2004
CA    2504133    5/2004
(Continued)

*Primary Examiner* — Christopher J Novosad
(74) *Attorney, Agent, or Firm* — Ryan W. Dupuis; Kyle R. Satterthwaite; Ade & Company Inc.

(57) ABSTRACT

An emissions recycling system is used on a vehicle towing an agricultural implement to enrich the fertility of the soil. The system includes an exhaust collector for collecting exhaust emissions from the internal combustion engine of the towing vehicle and an exhaust distribution system for injecting at least a portion of the exhaust emissions collected by the exhaust collector into the ground worked by the ground working tools of the agricultural implement. Fertility of the soil is enriched by bioactivity within the soil's micro flora which consumes the greenhouse gas and emissions.

15 Claims, 2 Drawing Sheets

(51) Int. Cl.
    *B01D 53/92*     (2006.01)
    *F02B 75/10*     (2006.01)
    *F01N 3/00*     (2006.01)
    *A01C 23/02*     (2006.01)
    *B01D 53/85*     (2006.01)
    *C05D 9/00*     (2006.01)
    *C05G 3/00*     (2006.01)
    *A01C 21/00*     (2006.01)

(52) U.S. Cl.
    CPC ............... *C05D 9/00* (2013.01); *C05G 3/0052* (2013.01); *A01C 21/007* (2013.01); *Y10S 111/90* (2013.01); *Y10S 47/10* (2013.01)
    USPC ............ 111/118; 111/200; 111/900; 123/1 R; 123/41.18; 47/1.01 R; 47/1.01 F; 47/58.1 SC; 47/57.5; 47/DIG. 10; 405/128.75; 405/128.8; 405/128.85; 405/131; 405/258.1; 405/303; 701/50

(56) References Cited

U.S. PATENT DOCUMENTS

| | | | |
|---|---|---|---|
| 4,182,278 | A | 1/1980 | Coakwell |
| 4,247,321 | A | 1/1981 | Persinger |
| 4,705,002 | A | 11/1987 | Ando et al. |
| 5,117,619 | A * | 6/1992 | Fassauer .................. 56/128 |
| 8,061,283 | B2 | 11/2011 | Lewis |
| 8,573,143 | B2 * | 11/2013 | Lewis .................. 111/118 |

FOREIGN PATENT DOCUMENTS

| | | | | |
|---|---|---|---|---|
| JP | 2000327472 | A * | 11/2000 | ............ 56/DIG. 3 |
| JP | 2002276341 | A * | 9/2002 | ............ 56/DIG. 3 |

\* cited by examiner

METHOD OF RECYCLING EXHAUST EMISSIONS

This application is a continuation of U.S. patent application Ser. No. 13/270,764, filed Oct. 11, 2011 which is a continuation of U.S. patent application Ser. No. 11/916,673, filed Jul. 15, 2008, and now issued as U.S. Pat. No. 8,061,283, which is a national phase filing of PCT/CA2006/000914, filed Jun. 6, 2006, and claims foreign priority benefits from Canadian Patent Application 2,509,172 filed Jun. 6, 2005.

FIELD OF THE INVENTION

The present invention relates to an exhaust emissions recycling system for recycling emissions from an internal combustion engine, and more particularly relates to a bioactive recycling method and the equipment therefore for incorporating green house gases and emissions into agricultural soils to provide plant nutrients and improvement growth characteristics of the soil.

BACKGROUND

Agriculture is a large consumer of hydrocarbons fuels and fertilizers. Conversions range around 20 calories to produce 1 calorie of food. The use of industrial fixed fertilizers has and will increase yields at a high energy cost. This inhibits the natural plant micro flora $CO_2$ relationship causing the plants to rely more on the applied fertilizers which causes imbalances in nutrient uptake and a plant's ability to control chloride uptake and pH balance. Bioactivity within the soil environment is limited by the lack of $CO_2$, $NO_2$ and $SO_2$. Micro-organisms use these compounds as an energy source to digest organic matter, dissolve minerals and fix $N_2$ from the air, breaking the N—N bond and making available various forms of nitrogen to plants.

This bioactivity is inhibited when large amounts of ammonium fertilizer are applied to the soil. Ammonium uptake by the roots causes the roots to use the $CO_2$ from photosynthesis to make urea before transporting nitrogen to the shoots. Excess hydrogen, leftover from ammonium and carbohydrates forming urea, is secreted by the roots instead of $CO_2$ that can feed bioactivity in the soil. Excess hydrogen makes the root zone acidic, causing problems with root growth and nutrient up take. This condition is worse in low pH soils, but can help in high pH soils if ammonium could be kept from volatilization.

SUMMARY OF THE INVENTION

The present invention assists in short circuiting the carbon and nitrogen cycle by directly incorporating emissions into the soil structure with minimal emissions escaping directly into the atmosphere.

According to one aspect of the present invention there is provided a method of improving growth characteristics of a soil, the method comprising:

operating an internal combustion engine to produce exhaust emissions;

incorporating the exhaust emissions into the soil; and increasing aerobic bacteria content in the soil by adding an oxidising agent to fuel of the internal combustion engine.

According to a second aspect of the present invention there is provided a method of improving growth characteristics of a soil, the method comprising:

operating an internal combustion engine to produce exhaust emissions;

incorporating the exhaust emissions into the soil; and increasing $NO_x$ content in the soil by adding a catalyst to the soil with the exhaust emissions.

According to a third aspect of the present invention there is provided a method of improving growth characteristics of a soil, the method comprising:

operating an internal combustion engine to produce exhaust emissions;

incorporating the exhaust emissions into the soil; and increasing $NO_x$ content in the soil by passing the exhaust emissions through an afterburner operating at a temperature greater than 1900 degrees Kelvin prior to incorporating the exhaust emissions into the soil.

According to a fourth aspect of the present invention there is provided a method of improving growth characteristics of a soil, the method comprising:

operating an internal combustion engine to produce exhaust emissions; collecting condensate from the exhaust emissions in a condensate tank;

culturing micro-organisms including aerobic bacteria in the condensate tank which feed on exhaust emissions in the collected condensate; and incorporating the cultured micro-organisms into the soil.

According to a fifth aspect of the present invention there is provided a method of improving growth characteristics of a soil, the method comprising:

operating an internal combustion engine to produce exhaust emissions;

incorporating the exhaust emissions into the soil; and drawing the exhaust emissions from the internal combustion engine into a suction side of a blower and distributing the exhaust emissions under pressure from a pressure side of the blower when incorporating the exhaust emissions into the soil.

According to a sixth aspect of the present invention there is provided a method of improving growth characteristics of a soil, the method comprising:

operating an internal combustion engine to produce exhaust emissions;

incorporating the exhaust emissions into the soil; and distributing the exhaust emissions through plastic distribution hoses of an agricultural seeding implement when incorporating the exhaust emissions into the soil; and cooling the exhaust emissions prior to distributing the exhaust emissions through the plastic distribution hoses.

According to a seventh aspect of the present invention there is provided a method of decomposing organic matter comprising:

operating an internal combustion engine to produce exhaust emissions; and mixing the exhaust emissions into the organic matter.

The methods disclosed herein may be combined and may also include any one of the following: injecting steam into the exhaust emissions; injecting ozone enriched air into the exhaust emissions; adding gases formed by electrolysis of water to the exhaust emissions; and/or oxidizing a metal using steam and incorporating oxidized metal into the soil with the exhaust gases.

According to an exemplary embodiment of the present invention there is provided an emissions recycling system for use with a towing vehicle having an internal combustion engine and an agricultural implement for being towed by the towing vehicle, the agricultural implement having a plurality of ground working tools for working the ground as the agricultural implement is towed across the ground; the system comprising:

an after burner mounted in the exhaust system directly after the turbo or exhaust manifolds with controlled air fuel ratio to raise the exhaust temperature above 2000 k because as temperature goes up more $NO_x$ is produced;

an exhaust collector for collecting exhaust emissions from the internal combustion engine of the towing vehicle;

an exhaust distribution system for injecting at least a portion of the exhaust emissions collected by the exhaust collector into the ground worked by the ground working tools of the agricultural implement; and a biological culturing tank that receives condensate from the collector and a distribution fan so that the condensate from the emissions feed the culture in the tank so that they reproduce rapidly and amino acids, enzymes, bacteria and fungi are produced;

the tank being arranged such that as condensate is added to the tank, an equal amount of cultured product is removed from the tank and applied to the soil, increasing the microbial population to assist the indigenous soil micro organisms in bioactivation of the applied emissions.

Bioactivity within the soil's micro flora consumes the greenhouse gas and emissions to enrich the fertility of the soil. When greenhouse gas and emissions are incorporated into agricultural soils, the bioactivity is increased mainly by the extra $CO_2$ available to the micro flora.

When incorporated emissions that are conditioned to match the soil pH and plant needs, the plant can grow with better nitrogen use efficiency and nutrient extraction from the soil naturally by greater bioactivity within the soil. An abundance of $CO_2$ is present to overcome the major limiting factor for free living nitrogen fixing bacteria.

When the plant uses nitrogen that has gone through the bioactivity cycle from emissions, or from free living nitrogen fixing bacteria that get their energy from the $CO_2$ in the emissions to fix nitrogen from the air, this natural plant feeding form of nitrogen takes the form of $NO_3$. When the roots take in $NO_3$, the energy cost of $CO_2$ is low as $NO_3$ is transported in association with potassium leaving the $CO_2$ to be secreted as root exudates to feed associated bacteria and fungi that in return feed back photo hormones and nutrients dissolved by secretions. The roots are not over loaded by hydrogen so pH is more balanced. $NO_3$— is an anion and $NH_4$+ is a cat ion. Nitrogen is the largest element taken up from the soil. This balance of cat ion and anion uptake can affect the plant's cat ion nutrient up take depending on soil pH and nutrient balances. Even plant types and genetic strains within plant types will grow to their full genetic potential by matching their preferred cat ion and anion balance to match the surrounding environment.

To overcome this complex balancing act the emissions conditioning chamber can be controlled by a computer that is programmed to plant type, soil type and environment with GPS and map production history. The emissions can be altered to maximize the genetic potential of the crop as the tractor is doing the tillage or seeding operation. This chemistry altering system controlled by the agronomic computer can alter the $NO_x$ produced by the engine, splitting the $N_2$ nitrogen in the air used for combustion. $NO_x$ production can be maximized by high temperatures, high compression fuel types, high or low sulphur content fuels for soil pH balance, or engine design. Adding or injecting a fuel additive that works as a catalyst in the flame of the combustion cycle produces more $NO_x$. The nitrogen molecules can be oxidized or hydrogenised within the emission conditioning chamber to emit $NO_3$— or $NH_4$+ or a mixture of the two.

The oxidation is achieved by injecting oxygen rich air from an alternator, generator or a high voltage ark at prescribed locations and temperatures within the chamber. The hydrogenation of the nitrogen can be increased by producing hydrogen within the chamber by circulating steam over the glowing hot iron or a mixture of metals to be oxidized, and releasing hydrogen near the exhaust manifold extending into the conditioning chamber, or by electrolysis of water. This electrolysis can be used to oxidize micro nutrients to help as a catalyst within the chamber or to add micronutrients to the soil. The hydrogen is used to hydrogenise the nitrogen.

A catalyst and or a catalytic converter can be used at various locations in the system to speed up desired chemistry. The altering of the emissions could be fixed or the onboard agronomic computer can alter the chemistry on the go by sensing soil types past production and using GPS to make an emission fertilizer tailor made to maximize genetic potential of the crop growing at that specific site in the field. Some agricultural landscapes can have a large variation in soil types and can be the production limiting factor.

To help overcome this challenge the onboard agronomic computer can select from a selection of 2 or more seed genetics and seed rates to match the soil's ability to yield its maximum potential. For example, on hilly land with sandy hill tops having high pH, low spots with low pH and salty areas, the computer would select a drought resistant variety for hilltops while switching the fuel to a high sulphur content to lower the pH. Nitrogen would be best in the form of $NH_4$+ to help acidify the root zone. In the low land, a lodge resistant, low pH variety is preferred while the emissions would switch to a $NO_3$ form of nitrogen with a low sulphur content fuel and oxidize copper with electrolysis. In salty areas, a variety is selected that resists salt uptake, and emissions could be a mixture of $NO_3$ and $NH_4$ with high sulphur content fuel.

The ground speed could be reduced to condition the salty soil with more bioactive emissions as $CO_2$ would help restore a bacteria presence in the soil to interact with the plants. The GPS and field mapping would interact when tilling multiple times and when seeding, the seeding equipment would be able to hold multiple varieties and vary the seed rates. Alternatively, it could be a one pass operation involving tilling, seeding, and bioactive recycling of emissions to maximize production with low emissions capturing all the energy and plant nutrition from the hydrocarbon fuel.

As described herein, an agricultural tractor, used for tilling or incorporating seed into the soil or the like, burns a hydrocarbon fuel at optimum stoichiometric ratio, emitting $CO_2$, $NO_2$, and $SO_2$ and other emissions into an emissions conditioning exhaust chamber.

A steam pressure chamber surrounds the conditioning chamber. Water is injected into the chamber. As the water boils it removes heat from the exhaust stream creating pressure in the boiler chamber which injects the steam into the exhaust conditioning chamber near the exhaust manifold where a replaceable cast iron pipe glows red hot. As steam passes around the iron, the oxygen in the steam oxidizes the cast iron, releasing hydrogen that will hydrogenate the free N molecules to form $NH_4$. Other metals can be used to provide micronutrients as needed.

A recirculation water injection system is located within the conditioning chamber at various locations to react with emissions for desired chemical reactions and to produce steam that will mix with the emissions to condition and react to make desirable chemistry to match soil, micro flora and plant needs.

An oxygen rich air injection system is located at various locations and temperatures to oxidize the free N molecules to form $NO_3$. High voltage electrodes and electromagnetic fields aid in the chemical reactions.

A water electrolysis system produces oxygen and hydrogen, for use directly or to oxidize metals into micro nutrients for soil and crop requirements, or to be a catalyst in the conditioning chamber.

A catalytic converter is coupled to an inlet of the exhaust conditioning chamber using various catalysts depending on fuel type or chemical reactions required.

The exhaust distribution system is provided to mount on the agricultural tillage or seeding equipment attached to the tractors exhaust conditioning chamber, via a flex hose.

A distribution injection fan, run with a hydraulic orbit motor, maintains exhaust flow with no back presser on the exhaust system.

A condensed water return line from the injection fan conserves water as water is transported with the equipment in a large tank, and only steam with the conditioned emissions are injected into the soil.

A injection network of flexible steam hoses is used which can withstand steam up to 450 degrees Fahrenheit or 230 degrees Celsius. The hoses are connected to the tillage points under the soil. As the soil is fractured and loosened the steam and conditioned emissions are injected into the furrows formed and trapped below the surface of the soil to become bioactive. The distribution system of hoses is sized to match the volume of the emissions flow.

A computer manages the many chemical reactions to produce the most beneficial bioactive emissions matching soil type and plant genetic requirements responding to GPS and crop mappings.

According to yet another aspect of the present invention there is provided a method of decomposing organic matter comprising:

operating an internal combustion engine to produce exhaust emissions; and mixing the exhaust emissions into the organic matter.

When the internal combustion engine comprises part of a grain harvester including a straw chopper and the organic matter comprises straw, the method may include mixing the exhaust emissions with the straw in the straw chopper.

When the internal combustion engine comprises part of a lawn mower including a mulching deck and the organic matter comprises grass, the method may include mixing the exhaust emissions with the grass in the mulching deck.

When the internal combustion engine comprises part of compost mixing equipment and the organic matter comprises compost, the method may include mixing the exhaust emissions with the compost using the compost mixing equipment.

When the internal combustion engine comprises part of a liquid waste management equipment and the organic matter comprises organic liquid waste, the method may include mixing the exhaust emissions with the organic liquid waster managed by the liquid waste management equipment.

When the internal combustion engine comprises part of a forage chopper and the organic matter comprises forage being chopped, the method may include mixing the exhaust emissions with the forage being chopped by the forage chopper.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
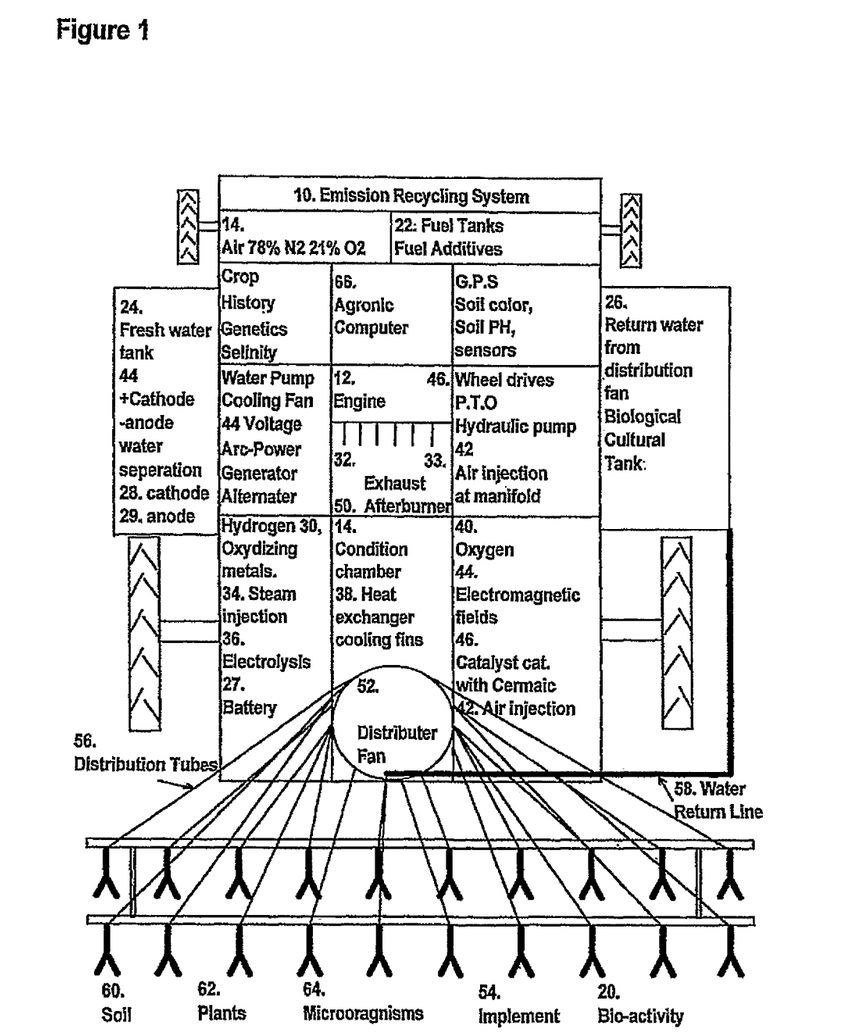
FIG. 1 is a schematic view of emissions recycling system in which bioactive emissions are incorporated into agricultural top soil.
Figure 2:
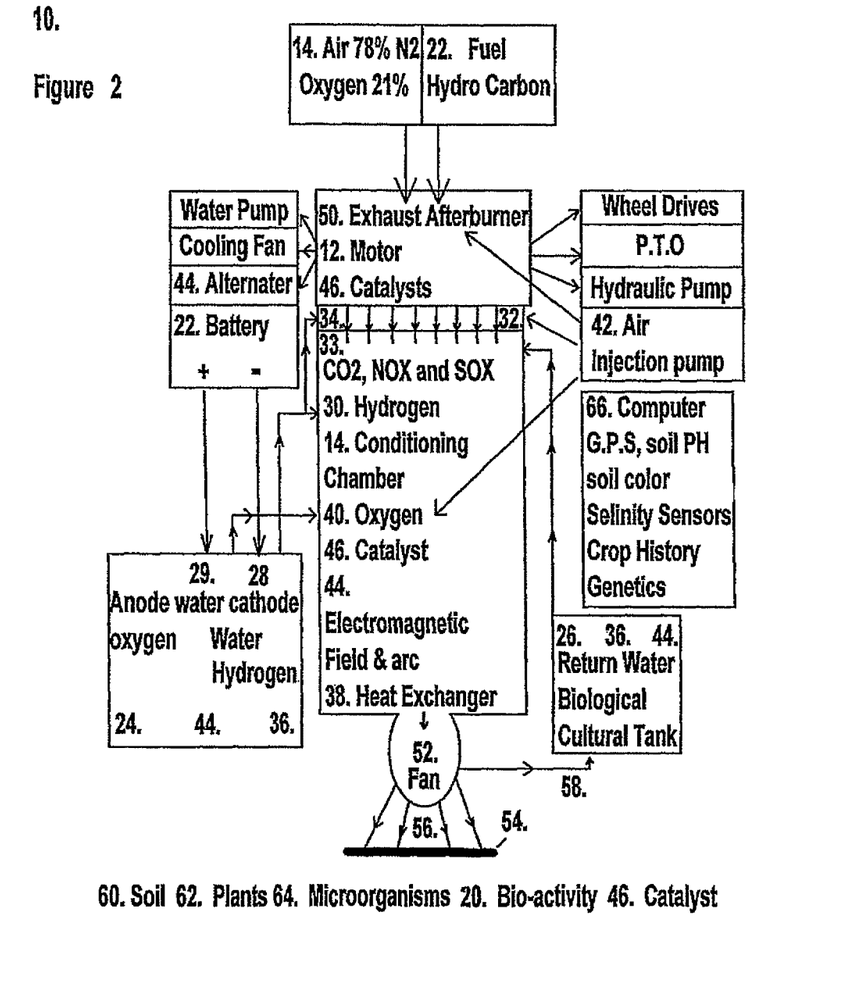
FIG. 2 is a flow chart diagram illustrating the method in which internal combustion engine emissions become bioactive when they are incorporated into the topsoil.

Referring to the accompanying drawings, there is illustrated an emissions recycling system generally indicated by reference numeral 10. The recycling system is designed to condition emissions in the emissions conditioning chamber 14. Internal combustion engine emissions and green house gases such as $CO_2$, $NO_X$, and $SO_X$ can be chemically and catalytically conditioned and cooled to match the plant soil micro flora and micro fauna needs.

The system 10 includes an agricultural tractor or the like with an internal combustion engine 12 operating at optimum stoichiometric ratio to break the $N_2$ bonds and achieve complete combustion. As a result, all hydrocarbons are burned, releasing all the energy of the fuel to provide kinetic energy to till, seed or rotor till the soil or implement of the like 54 that fractures the soil. This allows the emissions to be buried or well mixed into the soil structure, becoming bioactive with the micro flora 64 bacteria, fungi, and micro-organisms that in return release nutrients from the soil organic matter and minerals. Free living bacteria 64 bio-activate 20 $CO_2$ and fix $N_2$ from the air to make plant usable nitrogen. The catalyst that makes this happen is molybdenum that may need to be applied with emissions if the fuel source 22 does not contain sulphur, molybdenum as a lubricant. Two types of fuel could be used and chosen to best suit the soil as sulphur lowers pH and helps salt resistance, but on low pH soil, a low sulphur fuel would be burnt as determined by the agronomic computer 66 to avoid further acidification of the soil.

The bioactive emissions recycling system 10 includes an emissions conditioning chamber 14 that is connected to the exhaust manifold. As the exhaust gasses pass through the chamber, various chemical reactions can be controlled to alter emissions to best suit the plant's soil type, pH and micro flora that bio-activate 20 the emissions hydrogen conditioning 30 and oxygen conditioning 40.

The N molecules will combine with hydrogen or oxygen making a cat ion (+) or an anion (−). Multiple compartment water tanks 24 and 26 store and reuse water at lower pH levels to aid in chemical reactions. The water makes steam in the boiler chamber 34 to be injected at various locations in the chamber.

Hydrogen conditioning 30 starts at the exhaust manifold 32, which is the hottest location to oxidize metals with steam injection. At the point of glowing hot metals, the oxygen oxidizes the metals, breaking the $H_2O$ bond, thus freeing hydrogen to combine with the N molecules as $NH_4$. The replaceable metal pipes 33 will oxidize away as the micronutrients including copper, zinc, nickel, and iron are beneficial to the soil. If lacking, the steam chamber 34 removes the heat from the conditioning chamber that creates steam pressure to inject steam into the chamber 14. Hydrogen can be released by electrolysis of acidic water 36, or recirculation of condensate within the chamber or from a distribution fan 52. A water return line 58 to the return storage tank 26 is used as the biological culture growing tank. As condensate is added the reproducing culture consumes the elements from the emissions producing amino acids, enzymes, bacteria and fungi. This culture is applied to the soil on the go as it reproduces. Heat exchanger 38 and cooling fins can cool the chamber 14.

Oxygen conditioning can start in the exhaust manifold 32 to burn unburned hydrocarbons or within a three stage catalytic converter 46. Air injection 42 of $O_3$, may be produced from an alternator or a generator high voltage arc. Catalysts 46 are located in various locations to speed up reactions in the chamber 14. The inside of the combustion chamber is impregnated with a ceramic parts coating that helps the engine 12 withstand hotter exhaust temperatures. Electromagnetic fields, a cathode and an anode in the water tank make water favour hydrogen at the cathode outlet 28 connected to the negative terminal of the battery 27 or oxygen at the anode outlet 29 connected to the positive terminal of the battery 27.

A distribution system 50 is retrofitted to tillage equipment 54 or the like by distribution hoses 56 which withstand up to 450 degrees F. or 230 degrees Celsius of steam. Otherwise a heat exchanger 38, or any other form of cooling mechanism, is used to remove heat from the hoses 56 which are connected to the tillage points to incorporate all the emissions into the soil structure. In other embodiments, the emissions are distributed into a rotor tiller hood or a lawn mower deck to be well mixed into the soil or grass mulch.

The distribution fan 52 maintains air flow in the system is to avoid back pressure on the engine.

Soil 60 can vary in pH, and have excessive or lacking elements. The plants 62 adapt to the soil chemistry. Micro-organisms 64 bio-activate the emissions. Certain micro-organisms live off of the emissions and feed back the nutrients that they have bio-activated 20 back to the plants 62 when they die. To manage the many variable requirements of the soil 60, the plants 62 and the micro-organisms 64, an agronomic computer 66 alters the emissions to best meet the soil micro-organisms and crop needs.

As described herein, a bioactive recycling system uses the micro flora such as bacteria, fungi and organisms that are naturally with in the soil of a typical agricultural landscape. This bioactivity within the soil structure consumes the greenhouse gases and emissions from the hydrocarbons that are burnt at optimum stoichiometric ratio combustion in an agricultural tractor that is tilling or incorporating seed into the soil. Limited availability of $CO_2$, $NO_2$ and $SO_2$ can be a limiting factor of bioactivity with in the soil structure. Plants and micro flora use these emissions as an energy source to assist in the cycle of plant nutrients. For example, free-living-nitrogen-fixing organism's ability to fix $N_2$ from air within the soil structure is limited by the demand on $CO_2$ as plants and their root's associated micro flora get first chance at the $CO_2$ from photosynthesis. This shortage is greater when applied fertilizer's ammonium is taken up by the roots as $CO_2$ has to combine with the ammonia as urea is transported to the shoots. This $CO_2$ consumption takes energy from the plant which causes a $CO_2$ shortage at the roots instead of $CO_2$ which exudates. Hydrogen from the roots has to be secreted causing problems with pH balance, nutrient uptake and root growth.

$NO_X$ emissions recycled into the soil are consumed by nitrobacteria in various oxidations to $NO_3$ as an energy source. Uptake by the roots of $NO_3$ allows the plant to secrete $CO_2$ for its roots to feed associated root bacteria. In return, the bacteria feeds back photo hormones CYT, IAA and GA back to the plant. Less hydrogen has to be secreted from the roots, thus balancing pH, increasing efficiency of nitrogen use, and improving nutrient extraction by fungi to root associations. Any leftover $CO_2$ goes to free-living bacteria that fix $N_2$ from the air in the soil.

$SO_2$ emissions are useful to balance pH as it is oxidized by bacteria for plant uptake and salt tolerance. The complexities of the soil and plant requirements can be matched by the chemistry altering methods with in the exhaust conditioning system. These methods include selecting a type of fuel which has either a high or low sulphur content, varying fuel combustion temperature, varying catalytic chemistry, providing electrolysis to oxidize micro nutrients, producing hydrogen from glowing hot cast iron with steam circulation in the conditioning chamber, or providing air with ozone rich oxygen from an alternator, generator or high voltage arc injected for oxidation. The method has no need to scrub out the emissions or add binders that tie up or store them for disposal. The complete exhaust stream is placed below the soil surface as the tractor and equipment are tilling the soil or incorporating seed within the soil, so as to release minimal emissions to the atmosphere as conditioned emissions are altered to be chemically bioactive within the soil profile to maximize plant growth and shorten the $CO_2$, $NO_2$, $SO_2$ emissions cycle.

The bioactive emissions recycling process incorporates the emissions from an internal combustion engine into the topsoil while the agricultural tractor is pulling the tillage or seeding equipment. The emissions become bioactive by the micro flora of the soil as $CO_X$, $NO_X$, $SO_X$ and other emissions are consumed as an energy source while releasing plant usable nutrients or fixing nitrogen from the air.

The system includes an emissions conditioning chamber for collecting and receiving the exhaust gas from the internal combustion engine of the tractor. Emissions from the internal combustion engine flow through the chamber, which conditions and alters the chemistry of the emissions to best suit the plant genetics, soil pH, salinity and the bioactive soil micro flora.

Steam is injected into the chamber at various locations within the chamber to release hydrogen. The steam can be directed near glowing hot iron or a combination of metals connected to the exhaust manifold. The oxygen oxidizes the metal, releasing the hydrogen to react with the emissions. The oxidized metal is carried by the steam and emissions to mix with the soil. Steam is created in a heat transfer chamber around the conditioning chamber. The water is injected into the chamber and the heat that boils the water is removed from the emissions gases to cool the exhaust flow before oxygen or air is injected. Hydrogen and oxygen can be formed by electrolysis of water using a cathode and anode or alternatively by passing protons through a member. Alternatively a catalyst or an electromagnetic field can be used to enhance conditioning of the emissions.

Air is injected into the chamber at various locations and can oxidize the emissions to desirable forms of chemical reactions. Atmospheric air, oxygen enriched air from electrolysis, or $O_3$ enriched air from an electronic device, including an alternator or generator, may be used for injection. Air injection is performed at high heat locations or within the catalytic converter to burn unburned hydrocarbons and produce more $CO_2$ emissions. An after burner 50 with a controlled air fuel ratio can raise the temperature above 2000 k as temp goes up $NO_x$ levels go up. Air injection in the cooler locations unable to support combustion will aid in chemical reactions.

Water injection into the chamber is performed at various locations as a carrier of dissolved elements to aid in conditioning the emissions and assist in the bioactivity in the soil. Nickel can be added to enhance $NH_4$ metabolism, molybdenum can be added to aid in $NO_3$ metabolism and bacteria assist in $N_2$ fixation. Water recirculation or recovery at the point of incorporation can conserve water use and aid in chemical reactions within the chamber. Low pH water will release more hydrogen to make $NH_4$. High pH water has less hydrogen and more oxygen to make $NO_3$.

Electromagnetic high voltage fields, high voltage carbon electrode arcs, cathodes, anodes, electro negativity of elements and catalytic aid of metals can be used to speed up chemical reactions and can be located from the combustion chamber to the point of emission incorporation into the soil.

The emissions distribution system is mounted on the tillage or seeding equipment via flex hoses from the emissions conditioning chamber. The flex hoses comprise a network of heat resistant steam hoses that can withstand a maximum temperature of 450 F or 230 C. A distributor fan maintains air flow and lower back pressure on the exhaust system.

The flex hoses are connected to the tillage points under the soil. As the soil is tilled and fractured, the steam and conditioned emissions fill the air spaces in the soil to become bioactive. When incorporating emissions through a conventional air seeder, the exhaust temperature has to be cooled with a heat exchanger to prevent heat damage to the air distribution system when incorporating emissions. When using a rotor tiller, the emissions are injected evenly inside the tiller hood. The emissions become well mixed into the soil. Lawn mower decks work well to incorporate the emissions into the lawn and clippings. As the steam from the emissions conditioning chamber contacts the clippings, bioactivity is sped up to decay the clippings, thus recycling the nutrients and emission back to the lawn. Grain harvesters can apply emissions at a straw chopper to speed up straw breakdown. Steam injection air to air cooler prevents fire. Forage choppers burning bio-diesel can use cooled emissions that form urea as a protein booster to improve feed value. Compost turning equipment will speed the compost by stimulating aerobic activity fuel additive and $CO_2$ will increase aerobic to anaerobic ratio in closed or open compost systems. Liquid manure lagoon agitation motors emissions can be incorporated at agitation time to raise carbon to nitrogen ratio and lower ammonia and sulphur smell.

Internal combustion engine modifications and adjustments to aid in $N_2$ conversion to $NO_x$ include adjustments to ignition timing the maximum advanced and grade of fuel to support advanced ignition timing. Diesel injection spray pattern split injection timing can be altered to increase $NO_x$. A cooling system thermostat needs to maintain maximum operating temperature. Antifreeze that boils at a higher temperature should be used. Higher compression ratio or use of a turbo booster to raise combustion flame temperature is desirable. To protect engine internal parts to withstand the extreme heat, the parts can be protected with a coating of ceramic with a catalyst impregnation to speed up $NO_X$ production internally in the engine. Exhaust gas recirculation $NO_X$ control equipment needs to be disabled or removed as the $NO_X$ produced by internal combustion is now capturing the energy released by the internal combustion. The $NO_X$ is bio-activated by the soil bacteria converting the $NO_X$ into plant usable nitrogen.

As described herein the growth characteristics in soil which assist in how well plants grow can be improved by various means when exhaust emissions from an internal combustion engine is incorporated into the soil by tillage equipment. The growth characteristics can be improved by increasing the aerobic bacteria content in the soil by adding an oxidizing agent to the fuel of the engine or by providing a culturing tank in which micro organisms which feed on exhaust emissions can be cultured for subsequent distribution or incorporation into the soil as well. The growth characteristics can also be improved by increasing $NO_X$ content in the soil either by adding a catalyst to the soil with the exhaust emissions or by passing the exhaust emissions through an afterburner which elevates the temperature of combustion to increase the $NO_X$ content in the exhaust emissions which are subsequently incorporated into the soil. The oxidizing agent which is added to the fuel as described herein may comprise any form of chemical compound that readily gives up oxygen or a substance that gains electrons in a redox chemical reaction. In doing so the oxidizing agent becomes reduced in the process. When adding an oxidizing agent, the computer 66 is arranged to control an amount of the oxidizing agent being added to the fuel responsive to measured growth characteristic of a sample of the soil which measures characteristics such as ph level and the like.

When adding a catalyst to increase the $NO_X$ content in the soil, the catalyst may be added to seed which is to be planted into the soil or alternatively the catalyst maybe added to the soil by adding to the fuel of the internal combustion engine prior to combustion. The catalyst is selected from the group including nickel, cobalt, molybdenum, chromium or iron and is characterized in that it can withstand the elevated temperatures of greater than 1900 degrees Kelvin in the afterburner while still having some useful effect as a catalyst when injected into the ground with the exhaust emissions after combustion. In addition to catalysts added to the fuel, pH level of the exhaust emissions can be adjusted by adding sulphur to the fuel of the internal combustion engine. The computer 66 in this instance is arranged to control the amount of catalyst or sulphur which is added responsive to measured growth characteristics of a sample of the soil or in response to measured conditions of the exhaust during operation.

The afterburner 50 can be used to increase the $NO_X$ content in the soil by passing the exhaust emissions therethrough at an operating temperature at greater than 1900 degrees Kelvin prior to incorporating the exhaust emissions into the soil. At these temperatures additional reactions are encouraged which would not normally take place in a normally operating internal combustion engine. The afterburner receives both the exhaust emissions therethrough along with some additional fuel and air to optimize the elevated operating temperature of the afterburner. The fuel may comprise the same fuel as the tractor or other equipment with which the internal combustion engine is associated, or may comprise an alternative fuel, for example oils having more carbon in the form of longer chain carbon molecules which are heavier to increase carbon dioxide production and to promote oxidizing metals. Desirable bacteria in the soil use oxidized metals produced as a result of the heavier carbon fuels as an energy source so that feeding the aerobic bacteria produces more plant nutrients resulting in more fertile soil.

The computer 66 in this instance is arranged to vary composition of the exhaust emissions by varying operating temperature of either one of the internal combustion engine or the afterburner. The computer is further arranged to control the amount of fuel or air added to the exhaust emissions at the afterburner and the ratio thereof prior to passing the exhaust emissions through the afterburner in response to measuring both characteristics of the soil to determine what additional nutrients are most effective to be incorporated into the soil.

To be used either in combination with catalysts added to the fuel, oxidizers added to the fuel, and an afterburner for elevating the operating temperature of combustion of the exhaust emissions, the condensate tank 26 further improves the growth characteristics of the soil by increasing the aerobic bacteria content in the soil by culturing these bacteria along with any other beneficial micro organisms including various fungi and the like. The bacteria or other micro organisms cultured in the tank are typically not indigenous to the soil being improved to further enhance the benefits thereof.

The computer 66 in this instance controls operation of the tank by maintaining the tank at a desired operating temperature to most encourage production of bacteria or other micro organisms while also being arranged to control the rates at which condensate is added and removed from the tank so that an equal amount of cultured bacteria and micro organisms is solution is removed and incorporated into the soil as the amount of new condensate with exhaust emissions incorporated therein is introduced into the tank.

To further enhance the benefits noted above, the system includes a suitable blower which draws exhaust emissions from the internal combustion engine into a suction side of the blower and distributes the exhaust emissions under pressure from the pressure side of the blower to optimize efficiency and to provide some control as to the rate at which exhaust emissions are incorporated into the soil. The computer 66 in this instance controls the rate of the blower responsive to the speed of internal combustion being displaced over the ground in the instance of agricultural equipment including tillage or seeding equipment for example. The rate of the blower accordingly is controlled responsive to demands for exhaust emissions incorporated into the soil.

When using an afterburner in particular or simply when feeding exhaust emissions directly from internal combustion engine to a network of distribution hoses for incorporation to the ground, for example the plastic distribution hoses of an agricultural seeding implement, a cooler, comprising is provided in series with the exhaust emissions to cool the exhaust emissions prior to distributing them through the plastic hoses so that no modification to the distribution equipment is required while still protecting any plastic parts from damage of excessive heat.

The system as described herein may also be used for other organic matter other than simply incorporating the emissions into the soil, for decomposing the organic matter so it can then be used as an additive to soil. To encourage decomposition of organic matter the internal combustion engine is again operated to produce exhaust emissions which are then in turn mixed into the organic matter. When the internal combustion engine comprises part of a grain harvester having a straw chopper, the method includes mixing the exhaust emissions with the straw in the straw chopper to assist in the decomposition of the straw. Alternatively when the organic matter comprises grass which is cut by a mulching deck of a lawn mower, exhaust emissions from the internal combustion engine of the mower can be mixed with the grass in the mulching deck to assist in its decomposition. Emissions from an internal combustion engine associated with compost mixing equipment can be mixed with the compost using the compost mixing equipment. In liquid waste management equipment, exhaust emissions from any internal combustion engines associated therewith can be mixed into the liquid organic waste managed by the equipment, for example equipment used to manage waste in a lagoon or the like. Yet a further example exhaust emissions from the internal combustion engine from a forage chopper may be mixed in with the forage being chopped to assist in the decomposition thereof.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of decomposing organic matter comprising:
   operating an internal combustion engine to produce exhaust emissions;
   passing the exhaust emissions through an emissions conditioning chamber so as to cool the exhaust emissions;
   adding the exhaust emissions to the organic matter subsequent to cooling the exhaust emissions; and
   mixing the exhaust emissions into the organic matter.

2. The method according to claim 1 wherein the internal combustion engine comprises part of a grain harvester including a straw chopper and the organic matter comprises straw, the method including mixing the exhaust emissions with the straw in the straw chopper.

3. The method according to claim 1 wherein the internal combustion engine comprises part of a lawn mower including a mulching deck and the organic matter comprises grass, the method including directing the exhaust emissions into the mulching deck, and using the mulching deck to mix the exhaust emissions with grass clippings in the mulching deck.

4. The method according to claim 1 wherein the internal combustion engine comprises part of compost mixing equipment and the organic matter comprises compost, the method including mixing the exhaust emissions with the compost using the compost mixing equipment.

5. The method according to claim 1 wherein the internal combustion engine comprises part of a liquid waste management equipment and the organic matter comprises organic liquid waste, the method including mixing the exhaust emissions with the organic liquid waste managed by the liquid waste management equipment.

6. The method according to claim 1 wherein the internal combustion engine comprises part of a forage chopper and the organic matter comprises forage being chopped, the method including mixing the exhaust emissions with the forage being chopped by the forage chopper.

7. The method according to claim 1 wherein the internal combustion engine comprises part of an implement including a mixing element arranged to mix the organic matter and wherein the method includes directing the exhaust emissions from the internal combustion engine of the implement to the mixing element of the implement.

8. The method according to claim 7 wherein the internal combustion engine comprises part of a grain harvester including a straw chopper which defines the mixing element and the organic matter comprises straw, the method including mixing the exhaust emissions with the straw in using the straw chopper.

9. The method according to claim 7 wherein the internal combustion engine comprises part of a lawn mower including a mulching deck which defines the mixing element and the organic matter comprises grass, the method including mixing the exhaust emissions with the grass in using the mulching deck.

10. The method according to claim 7 wherein the internal combustion engine comprises part of compost mixing equipment and the organic matter comprises compost, the method including mixing the exhaust emissions with the compost using the compost mixing equipment.

11. The method according to claim 7 wherein the internal combustion engine comprises part of a liquid waste management equipment and the organic matter comprises organic liquid waste, the method including mixing the exhaust emissions with the organic liquid waste managed by the liquid waste management equipment.

12. The method according to claim 7 wherein the internal combustion engine comprises part of a forage chopper and the organic matter comprises forage being chopped, the method including mixing the exhaust emissions with the forage being chopped by the forage chopper.

13. The method according to claim 1 further comprising injecting water into the emissions conditioning chamber to condition the exhaust emissions.

14. The method according to claim 1 further comprising using a catalyst in the emissions conditioning chamber to condition the exhaust emissions.

15. The method according to claim 1 further comprising injecting air into the emissions conditioning chamber to condition the exhaust emissions.

\* \* \* \* \*